United States Patent
Bastos et al.

(10) Patent No.: US 7,256,796 B1
(45) Date of Patent: *Aug. 14, 2007

(54) PER-FRAGMENT CONTROL FOR WRITING AN OUTPUT BUFFER

(75) Inventors: Rui M. Bastos, Porto Alegre (BR); John Erik Lindholm, Saratoga, CA (US); Matthew N. Papakipos, Palo Alto, CA (US)

(73) Assignee: NVIDIA Corporation, Santa Clara, CA (US)

(*) Notice: Subject to any disclaimer, the term of this patent is extended or adjusted under 35 U.S.C. 154(b) by 421 days.

This patent is subject to a terminal disclaimer.

(21) Appl. No.: 10/910,046

(22) Filed: Aug. 3, 2004

(51) Int. Cl.
*G09G 5/00* (2006.01)
(52) U.S. Cl. .................. 345/614; 345/589; 345/629
(58) Field of Classification Search ............ 345/614, 345/589, 629
See application file for complete search history.

(56) References Cited

U.S. PATENT DOCUMENTS

| 6,597,363 B1* | 7/2003 | Duluk et al. ............. 345/506 |
| 2003/0142101 A1* | 7/2003 | Lavelle et al. ............ 345/537 |
| 2004/0169651 A1* | 9/2004 | Everitt et al. ............ 345/426 |

* cited by examiner

*Primary Examiner*—Matthew C. Bella
*Assistant Examiner*—Mike Rahmjoo
(74) *Attorney, Agent, or Firm*—Patterson & Sheridan, LLP

(57) ABSTRACT

A fragment program may configure a fragment shader to compute a destination position for a fragment, where the destination position is independent of a position computed for the fragment during rasterization of a primitive. The destination position may be computed based on fragment parameters such as color, depth, and transparency. A raster operation unit writes processed fragment data to the destination position. Furthermore, the fragment program may configure the fragment shader to compute a per-fragment stencil operation for use by the raster operation unit during stencil buffering.

28 Claims, 8 Drawing Sheets

PER-FRAGMENT CONTROL FOR WRITING AN OUTPUT BUFFER

FIELD OF THE INVENTION

One or more aspects of the invention generally relate to processing graphics data in a programmable graphics processor, and more particularly to producing per-fragment operation values and destination positions.

BACKGROUND

Current graphics data processing is exemplified by systems and methods developed to perform a specific operation on several graphics data elements, e.g., linear interpolation, tessellation, texture mapping, depth testing. Computation units are connected in a "shading pipeline" to perform shading operations and produce shaded fragment. In a conventional shading pipeline a position within an image that is represented as a pair of coordinates, e.g., (x,y), is specified for each fragment formed by the intersection of a pixel and a primitive. Each shaded fragment is stored in a frame buffer at the location specified by the position.

FIG. 1A is a prior art Output Buffer 130 including a Pixel 135 within a Primitive 125. Primitive 125 is defined by vertices, a Vertex 141, a Vertex 142, and a Vertex 143. A position, specified as a pair of (x,y) coordinates, is computed for a fragment within Pixel 135 during rasterization of Primitive 125. The fragment is shaded by the shading pipeline and the shaded fragment is stored in Output Buffer 130 at a location corresponding to the position. In order to control what is stored in Output Buffer 130 for a specific position to perform image-based warping or reprojection, Primitive 125 is tessellated to generate a very dense mesh such that each vertex in the mesh maps to a pixel in Output Buffer 130.

FIG. 1B is a prior art highly tessellated Primitive 125 where each pixel, such as Pixel 135, includes a vertex, such as a Vertex 145. Each vertex (and pixel) may be controlled using a vertex program, for example to control the position corresponding to a shaded fragment within the pixel to perform image-based warping or reprojection. Rather than tessellating a primitive, such as Primitive 125, to control the position corresponding to a shaded fragment within the primitive, it is desirable to control the position of a fragment without tessellating the primitive.

SUMMARY

The current invention involves computing a destination position for shaded fragment data, where the destination position is not necessarily based on a vertex position. The destination position is computed as specified by a fragment program. The shaded fragment data is stored in a location in an output buffer corresponding to the destination position. Furthermore, a per-fragment operation, such as a blend function, alpha function, stencil operation, or z compare function, may be determined using a fragment program and used to process the fragment.

Various embodiments of the invention include a fragment processing pipeline configured to produce shaded fragment data for an output buffer. The fragment processing pipeline includes a fragment shader and a raster operation unit. The fragment shader is configured to process a fragment to produce the shaded fragment data and compute a destination position for the fragment that is independent of a vertex position of a primitive including the fragment. The raster operation unit is configured to write the shaded fragment data to a location in the output buffer specified by the destination position.

Various embodiments of methods of the invention for determining a destination position corresponding to a fragment include receiving a first destination position that is dependent on vertex positions of a primitive including the fragment, computing a second destination position corresponding to the fragment, and storing output data for the fragment in an output buffer at a location corresponding to the second destination position.

Various embodiments of methods of the invention for providing per-fragment operation extension using a fragment program including determining a per-fragment operation value using the fragment program, reading fragment data from a location in an output buffer, performing a per-fragment operation specified by the per-fragment operation value on the fragment data to produce output data, and storing the output data stored in the location in the output buffer.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

The current invention involves new systems and methods for processing fragment data using a fragment program to compute destination positions and per-fragment operation values. Per-fragment control may include a destination position and one or more per-fragment operation values. The per-fragment operation values are used to process fragment data within a fragment processing pipeline to produce processed fragment data. The per-fragment destination positions correspond to locations within an output buffer used to store the processed fragment data and may be computed without tessellating a primitive so each pixel within the primitive corresponds to a vertex position.

Figure 1A:
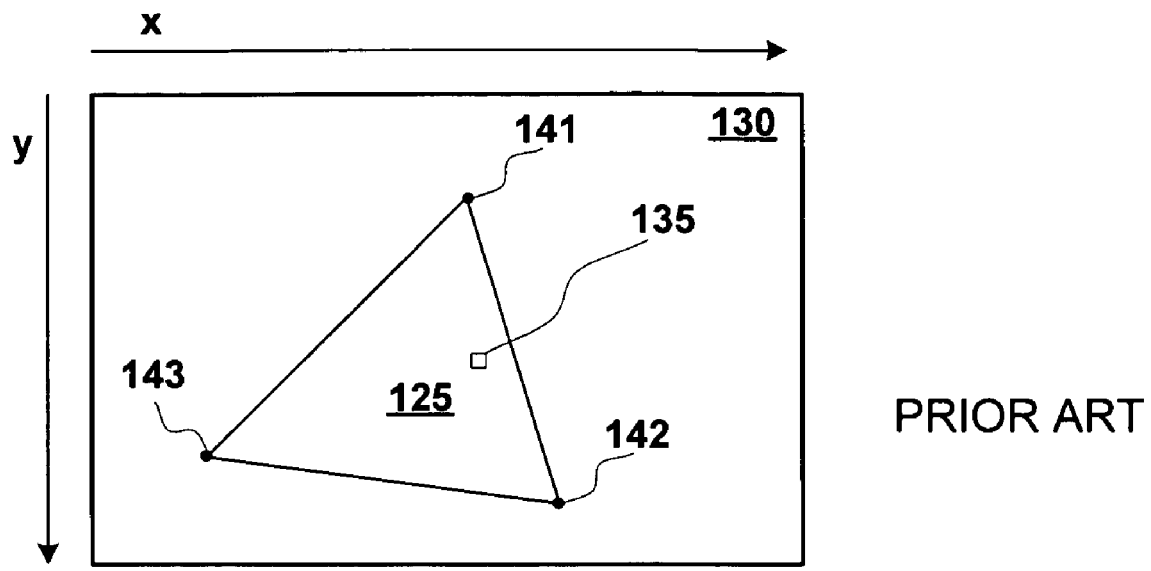
FIG. 1A is a prior art pixel within a primitive defined by vertices.
Figure 1B:
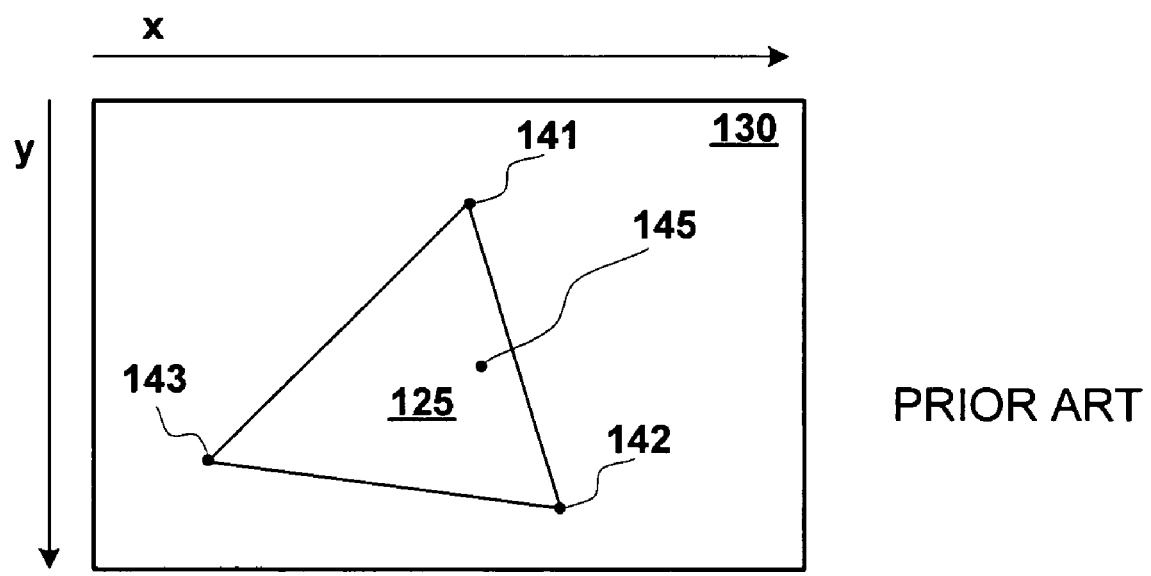
FIG. 1B is a prior art highly tessellated primitive where each pixel includes a vertex.
Figure 2:
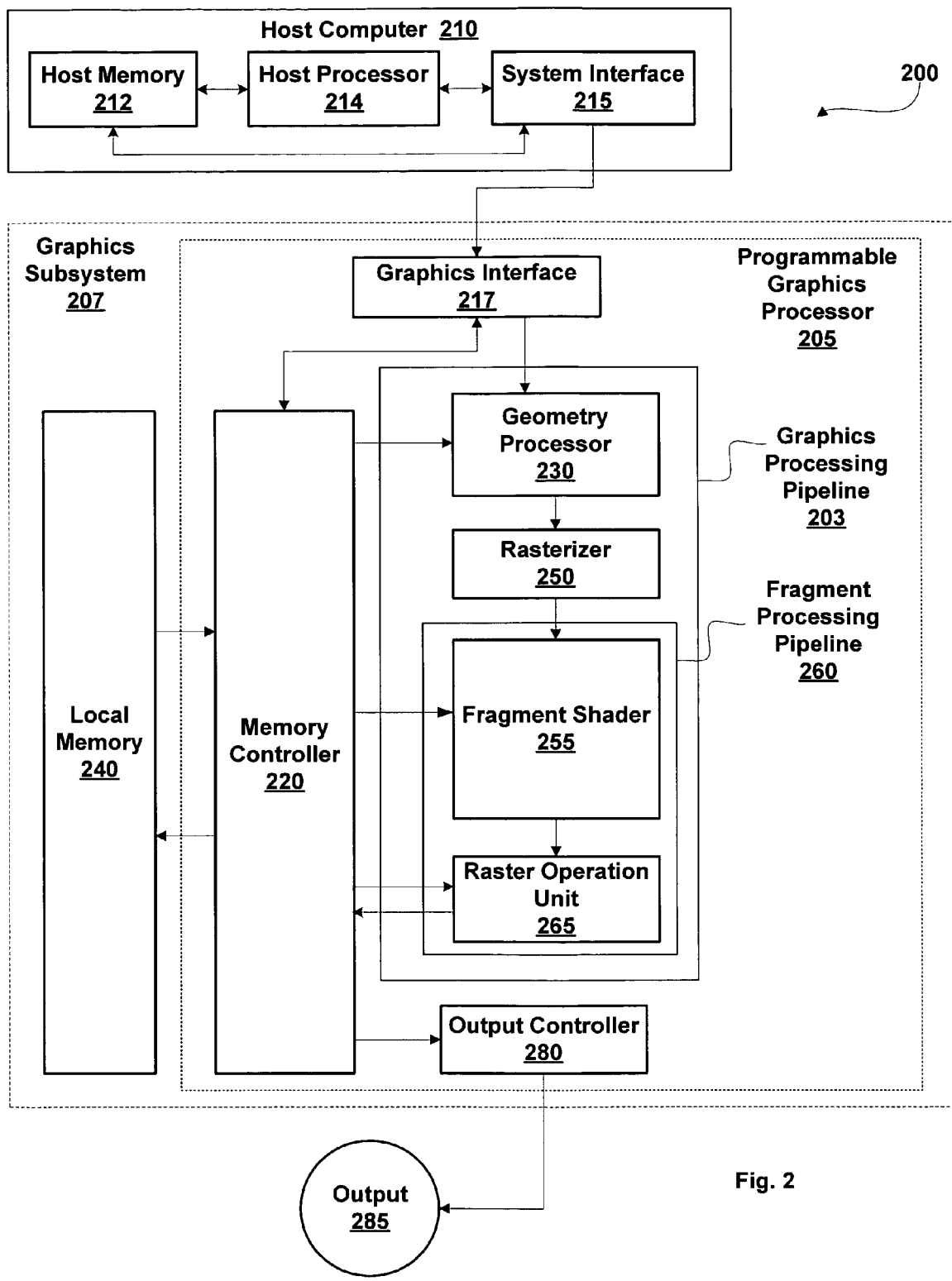
FIG. 2 is a block diagram of an exemplary embodiment of a respective computer system in accordance with one or more aspects of the present invention including a host computer and a graphics subsystem.

FIG. 2 is a block diagram of an exemplary embodiment of a Computing System generally designated 200 and including a Host Computer 210 and a Graphics Subsystem 207. Computing System 200 may be a desktop computer, server, laptop computer, palm-sized computer, tablet computer, game console, portable wireless terminal such as a personal digital assistant (PDA) or cellular telephone, computer based simulator, or the like. Host computer 210 includes Host Processor 214 that may include a system memory controller to interface directly to Host Memory 212 or may communicate with Host Memory 212 through a System Interface 215. System Interface 215 may be an I/O (input/output) interface or a bridge device including the system memory controller to interface directly to Host Memory 212. An example of System Interface 215 known in the art includes Intel® Northbridge.

Host computer 210 communicates with Graphics Subsystem 207 via System Interface 215 and a Graphics Interface 217. Graphics Subsystem 207 may include, without limitation, a Local Memory 240 and a graphics processor, such as, Programmable Graphics Processor 205. Programmable Graphics Processor 205 uses memory to store graphics data in multiple output buffers and program instructions, where graphics data is any data that is input to or output from computation units within Programmable Graphics Processor 205. Graphics memory is any memory used to store program instructions to be executed by Programmable Graphics Processor 205 or output buffers containing graphics data. Graphics memory may include portions of Host Memory 212, Local Memory 240 directly coupled to Programmable Graphics Processor 205, register files coupled to the computation units within Programmable Graphics Processor 205, and the like.

In addition to Graphics Interface 217, Programmable Graphics Processor 205 includes a Graphics Processing Pipeline 203, a Memory Controller 220 and an Output Controller 280. Data and program instructions received at Graphics Interface 217 can be passed to a Geometry Processor 230 within Graphics Processing Pipeline 203 or written to Local Memory 240 through Memory Controller 220. Memory Controller 220 includes read interfaces and write interfaces that each generate address and control signals to Local Memory 240, storage resources, and Graphics Interface 217. Storage resources may include register files, caches, FIFO (first in first out) memories, and the like. In addition to communicating with Local Memory 240, and Graphics Interface 217, Memory Controller 220 also communicates with Graphics Processing Pipeline 203 and Output Controller 280 through read and write interfaces in Graphics Processing Pipeline 203 and a read interface in Output Controller 280. The read and write interfaces in Graphics Processing Pipeline 203 and the read interface in Output Controller 280 generate address and control signals to Memory Controller 220.

Graphics Processing Pipeline 203 may include, without limitation, a geometry processor, such as Geometry Processor 230 and a programmable graphics fragment processing pipeline, such as Fragment Processing Pipeline 260, which each perform a variety of computational functions. Some of these functions are table lookup, scalar and vector addition, multiplication, division, coordinate-system mapping, calculation of vector normals, tessellation, calculation of derivatives, interpolation, and the like. Geometry Processor 230 and Fragment Processing Pipeline 260 are optionally configured such that data processing operations are performed in multiple internal passes through Graphics Processing Pipeline 203 or in multiple passes through Fragment Processing Pipeline 260. Each pass through Programmable Graphics Processor 205, Graphics Processing Pipeline 203 or Fragment Processing Pipeline 260 concludes with optional processing by a Raster Operation Unit 265. Data produced in a pass through Programmable Graphics Processor 205, Graphics Processing Pipeline 203 or Fragment Processing Pipeline 260 may be written to an output buffer in graphics memory including Local Memory 240 and/or Host Memory 212 to be read from at a later time.

Vertex programs are sequences of vertex program instructions compiled by Host Processor 214 for execution within Geometry Processor 230 and Rasterizer 250. Fragment programs are sequences of fragment program instructions compiled by Host Processor 214 for execution within Fragment Processing Pipeline 260. Geometry Processor 230 receives a stream of program instructions (vertex program instructions and fragment program instructions) and data from Graphics Interface 217 or Memory Controller 220, and performs vector floating-point operations or other processing operations using the data. The program instructions configure sub-units within Geometry Processor 230, Rasterizer 250 and Fragment Processing Pipeline 260. The program instructions and data are stored in graphics memory. When a portion of Host Memory 212 is used to store program instructions and data the portion of Host Memory 212 can be uncached so as to increase performance of access by Programmable Graphics Processor 205. Alternatively, configuration information is written to registers within Geometry Processor 230, Rasterizer 250 and Fragment Processing Pipeline 260 using program instructions, encoded with the data, or the like.

Data processed by Geometry Processor 230 and program instructions are passed from Geometry Processor 230 to a Rasterizer 250. Rasterizer 250 is a sampling unit that processes graphics primitives and generates sub-primitive data, e.g., fragment data, including coverage data for each pixel or sub-pixel position. Coverage data indicates which sub-pixel sample positions within a pixel are "covered" by a fragment formed by the intersection of a pixel and a primitive. Graphics primitives include geometry data, such as points, lines, triangles, quadrilaterals, meshes, surfaces, and the like. Rasterizer 250 converts graphics primitives into sub-primitive data, performing scan conversion on the data processed by Geometry Processor 230. Rasterizer 250 outputs fragment data, corresponding to a rasterized destination position, and fragment program instructions to Fragment Processing Pipeline 260. Therefore, the fragment programs configure Fragment Processing Pipeline 260 to operate on fragment data.

The fragment programs configure the Fragment Processing Pipeline 260 to process fragment data by specifying computations and computation precision. A Fragment Shader 255 is optionally configured by fragment program instructions such that fragment data processing operations are performed in multiple passes within Fragment Shader 255. Furthermore, Fragment Shader 255 may compute a destination position for a fragment that differs from the rasterized destination position received by Fragment Shader 255 for the fragment from Rasterizer 250. Fragment Shader 255 selectively outputs the rasterized destination position or the computed destination position as the destination position for the fragment as specified by the fragment program.

Fragment Shader 255 outputs shaded fragment data, destination positions, and codewords generated from fragment program instructions to Raster Operation Unit 265. The codewords may include per-fragment operation values, such as per-fragment stencil operations, z compare functions, alpha functions, and blend functions. Raster Operation Unit 265 includes a read interface and a write interface to Memory Controller 220 through which Raster Operation Unit 265 accesses data stored in one or more output buffers in Local Memory 240 or Host Memory 212. Raster Operation Unit 265 optionally performs near and far plane clipping and raster operations, such as stencil, z test, blending, and the like, using fragment data read from the one or more buffers in Local Memory 240 or Host Memory 212 at the destination position received from Fragment Shader 255 and the shaded fragment data to produce output data. The output data from Raster Operation Unit 265 is written to an output buffer in Local Memory 240 or Host Memory 212 at the destination position within the output buffer associated with the output data.

In various embodiments Memory Controller 220, Local Memory 240, and Geometry Processor 230 are configured such that data generated at various points along Graphics Processing Pipeline 203 may be output via Raster Operation Unit 265 and provided to Geometry Processor 230 or Fragment Shader 255 as input. The output data, e.g., color, depth, and other parameters, may be processed according to a fragment program and stored in one or more output buffers in graphics memory to be used as texture maps, e.g., shadow map, height field, stencil, displacement maps, and the like, by a fragment program. Alternatively, color and depth output data may be written to an output buffer, and later read and processed by Raster Operation Unit 265 to generate the final pixel data prior to being scanned out for display via Output Controller 280. The graphics data processed by Geometry Processor 230, Rasterizer 250, or Fragment Shader 255 of Graphics Processing Pipeline 203 can be primitive data, surface data, pixel data, vertex data, fragment data, or the like.

Whenever Fragment Shader 255 reads from an output buffer that is also being written to, position conflicts should be avoided. A position conflict exists when a destination position within an output buffer is read by Fragment Shader 255 or Raster Operations Unit 265 before the destination position within the output buffer is written by Raster Operations Unit 265. Destination positions for data to be written may be stored as state data in Fragment Shader 255. An output buffer ID specifying a unique output buffer containing data at destination positions is also stored as a portion of the state data. In some embodiments of the present invention, a write flag indicates each destination position that may be written by Raster Operations Unit 265. A write flag for a destination position is set by Fragment Shader 255 when the destination position enters proceeds past a read interface within Fragment Shader 255. The write flag for the destination position is cleared by Raster Operations Unit 265 when the destination position is processed and optionally written. Other techniques known to those skilled in the art may be used to detect and avoid position conflicts.

When processing is completed, an Output 285 of Graphics Subsystem 207 is provided using Output Controller 280. Alternatively, Host Processor 214 reads the composited frame, e.g., output buffer, stored in Local Memory 240 through Memory Controller 220, Graphics Interface 217 and System Interface 215. Output Controller 280 is optionally configured by opcodes, received from Graphics Processing Pipeline 203 via Memory Controller 220, to deliver data to a display device, network, electronic control system, another computing system, such as Computing System 200, another graphics subsystem, such as Graphics Subsystem 210, or the like.

Figure 3:
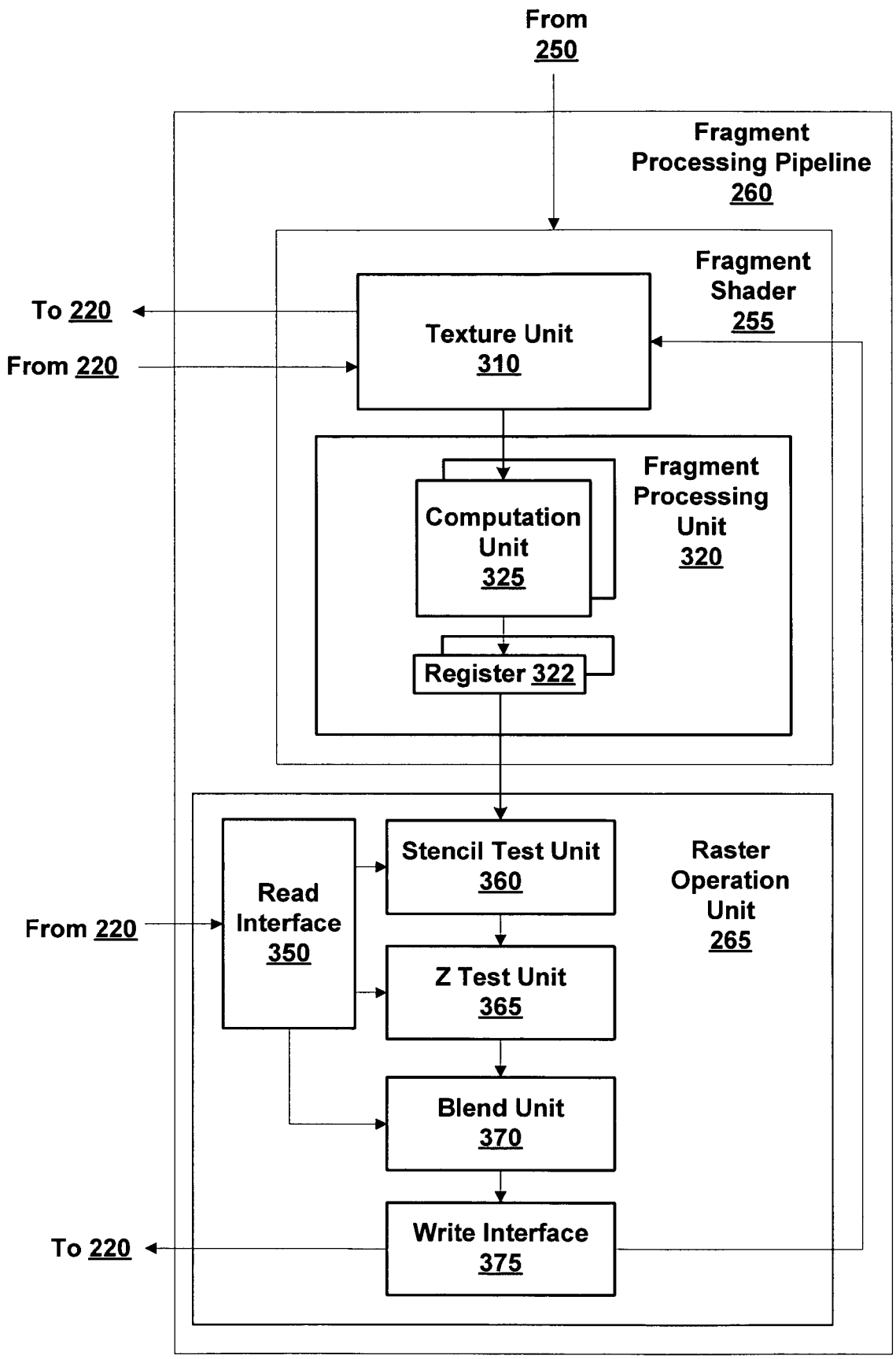
FIG. 3 is a block diagram of an exemplary embodiment of Fragment Processing Pipeline of FIG. 2 in accordance with one or more aspects of the present invention.

FIG. 3 is a block diagram of an exemplary embodiment of Fragment Processing Pipeline 260 in accordance with one or more aspects of the present invention. Fragment Shader 255, including a Texture Unit 310, receives fragment data, corresponding first destination positions, and fragment program instructions from Rasterizer 250. The first destination positions are interpolated coordinate pairs, e.g., (x,y), computed based on the vertex positions for each primitive. The fragment data may include parameters such as color, texture map coordinates, alpha (transparency), and the like. An interpolation unit (not shown) within Fragment Shader 255 or Rasterizer 250 may compute per-fragment parameters for each of the first destination positions as specified by the fragment program.

Texture Unit 310 receives texture coordinates and an output buffer identifier (ID) and determines a read address to read source data from. In some embodiments of the present invention, Texture Unit 310 is configured to perform position conflict detection prior to reading each output buffer location. Specifically, Texture Unit 310 waits to read any output buffer location for which a conflict exists until the position conflict is removed, for example by a Write Interface 375 within Raster Operation Unit 265 writing the output buffer location.

Texture Unit 310 may read additional fragment program instructions using a fragment program pointer. Texture Unit 310 receives the additional fragment program instructions and texture samples (depth map, light parameters, indices, texture map, height field, bump map, stencil values, shadow map, jitter values, and the like) stored in one or more output buffers from Local Memory 240 or Host Memory 212, via Memory Controller 220. The output buffer data stored in graphics memory may be generated by Programmable Graphics Processor 205, by Host Processor 214, by another device, by a human, or the like.

Texture Unit 310 outputs the texture samples, interpolated fragment parameters, and the additional fragment program instructions to a Fragment Processing Unit 320. Fragment Processing Unit 310 processes the texture samples and interpolated fragment parameters in one or more Computation Units 325 as specified by the additional fragment program instructions and stores shaded fragment data, e.g., color, depth, in Registers 322 as specified by the fragment program. A fragment program instruction may also configure one or more Computation Units 325 to determine a second destination position, e.g., (x,y), corresponding to a location in an output buffer which processed fragment data, e.g., color, depth, stencil, or the like, is written to by Raster Operation Unit 265. The computed second destination position is stored in Registers 322 as specified by the fragment program. Alternatively, the first destination position is stored in Registers 322 as specified by the fragment program.

For example, the second destination position may be determined based on a computed fragment parameter, such as depth, texture map coordinates, texture map identifier, color, alpha, or the like. Sorting fragment data into specific second destination positions may be used to produce a histogram for an image to display depth, texture, color, or alpha information for the image. A histogram may also be produced based on Fragment Shader 255 processing cycles or memory accesses to read texture samples or fragment program instructions. Computing a second destination position for a fragment may also be used to perform image-based warping or reprojection, as described further herein. Additional destination positions may be determined for a fragment, where each additional destination position is located within the output buffer specified by the first or second destination position or within another output buffer. Each additional destination position may be stored in Registers 322 as specified by the fragment program.

Fragment Processing Unit 320 may also compute per-fragment operation values, e.g., stencil operation, z compare function, blend function, alpha function, and the like, when one or more Computation Units 325 are configured as specified by the fragment program. The per-fragment operation values are stored in Registers 322 as specified by the fragment program. For example, a stencil buffer may be updated using per-fragment operation values, e.g., increment (INC), decrement (DEC), zero (ZERO) where the resulting stencil values stored in the stencil buffer produce a histogram for an image to display depth, texture, color, or alpha information for the image. In another example, the stencil buffer may be updated using per-fragment operation values to generate values produced from shadow volumes, as described in conjunction with FIG. 5B. Conventionally, operation values are not computed using a fragment program and may only change as frequently as once per primitive.

Fragment Shader 255 also produces codewords, optionally including per-primitive operation values using the additional fragment program instructions. Fragment Processing Unit 356 outputs the shaded fragment data from Registers 322 and destination position, e.g., first destination position, second destination position, or additional destination position, to Raster Operation Unit 265. The shaded fragment data stored in Registers 322 may be written to one or more output buffers via Raster Operation Unit 265.

In some embodiments Fragment Processing Unit 320 is configured to process at least two fragments in parallel. Likewise, Texture Unit 310 may also be configured to read two or more texture samples in parallel. Raster Operation Unit 265 optionally processes the shaded fragment data according to the codewords and per-fragment operation values. A Stencil Test Unit 360 within Raster Operation Unit 265 optionally reads stencil buffer locations specified by the destination position received with the shaded fragment data via a Read Interface 350. In some embodiments of the present invention, Read Interface 350 is configured to perform position conflict detection prior to reading each stencil buffer location. Specifically, Read Interface 350 waits to read any stencil buffer location for which a conflict exists until the position conflict is removed, for example by Write Interface 375 writing the stencil buffer location.

Stencil Test Unit 360 also receives per-fragment operation values, the destination position, and codewords received from Fragment Shader 255. One or more stencil buffers may be stored in Local Memory 240 or Host Memory 212, via Memory Controller 220. Stencil Test Unit 360 performs stencil testing when stencil testing is enabled using techniques known to persons skilled in the art. Inputs to Stencil Test Unit 360 include stencil values read from the stencil buffer locations and the per-fragment operation values. When either stencil testing is disabled or stencil testing is enabled and the stencil test passes, Stencil Test Unit 360 outputs the shaded fragment data, stencil value, per-fragment operation values, the destination position, and codewords to a Z Test Unit 365.

Z Test Unit 365 optionally reads z buffer locations specified by the destination position received with the shaded fragment data via Read Interface 350. In some embodiments of the present invention, Read Interface 350 is configured to perform position conflict detection prior to reading each z buffer location. Specifically, Read Interface 250 waits to read any z buffer location for which a conflict exists until the position conflict is removed, for example by Write Interface 375 writing the z buffer location.

In some embodiments of the present invention stencil values and z values are stored in a combined z/stencil buffer. Z Test Unit 365 also receives the shaded fragment data, per-fragment operation values, stencil value, the destination position, and codewords output by Stencil Test 360. One or more z buffers may be stored in Local Memory 240 or Host Memory 212, via Memory Controller 220. Z Test Unit 365 performs z testing when z testing is enabled using techniques known to persons skilled in the art. When the z test passes Z Test Unit 365 also applies the stencil operation specified by the per-fragment operation control value to the stencil value to produce a processed stencil value. Z Test Unit 365 outputs the z test result (pass or fail), the shaded fragment data, processed stencil value, the destination position, per-fragment operation values, and codewords to a Blend Unit 370.

Blend Unit 370 reads output buffer data via Read Interface 350 from one or more output buffers corresponding to the destination position received with the shaded fragment data. In some embodiments of the present invention, Read Interface 350 is configured to perform position conflict detection prior to reading each output buffer location. Specifically, Read Interface 350 waits to read any output buffer location for which a conflict exists until the position conflict is removed, for example by Write Interface 375 writing the output buffer location.

Blend Unit 370 blends the output buffer data with the shaded fragment data to produce processed fragment data when either z testing is disabled or the z test result indicates that the z test passed. Blend Unit 370 outputs the destination position and output data, including the processed fragment data and processed stencil value, to Write Interface 375. Write Interface 375 writes the output data to an output buffer stored in Local Memory 240 or Host Memory 212, via Memory Controller 220. Write Interface 375 provides a signal to Read Interface 350 indicating the destination position has been written so Stencil Buffer Unit 360 may update conflict detection state. Likewise, Write Interface 375 provides a signal to Texture Unit 310 within Fragment Shader 255 indicating the destination position corresponding to a particular output buffer ID has been written.

When a fragment program includes a flush instruction, Raster Operation Unit 265 outputs a signal to Texture Unit 310 indicating that all pending write operations have been completed. The flush instruction is used to avoid read-after-write position conflicts when reading from an output buffer. When a flush instruction is received by Texture Unit 310, Texture Unit 310 does not accept new texture map coordinates until receiving the signal indicating that all pending write operations have been completed from Raster Operation Unit 265.

Figure 4A:
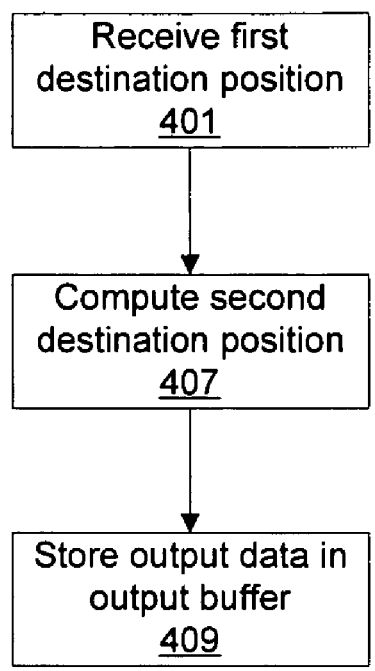
FIGS. 4A and 4B illustrate embodiments of methods of determining a fragment destination position in accordance with one or more aspects of the present invention.

FIG. 4A illustrates an embodiment of a method of determining a destination position for a fragment in accordance with one or more aspects of the present invention. The method may be used to compute destination positions to perform image-based warping or reprojection. Specifically, a scene is rendered to produce a color buffer and a depth buffer. The color and depth buffers are read as texture maps and mapped to a full screen quadrilateral to reproject the image to a different viewpoint or to warp the image during a second pass through Graphics Processing Pipeline 203. During the second pass the position of each texture sample is transformed using a transformation matrix to convert from the original viewpoint to the new viewpoint. The depth values read from the depth texture map are reprojected and depth sorted and the color values read from the color texture map are used to produce a reprojected or warped image.

In step 401 Fragment Shader 255 receives a first destination position corresponding to a fragment. In step 407 Fragment Processing Unit 320 is configured using at least one fragment program instruction to compute a second destination position corresponding to the fragment and to output the second destination position to Raster Operation Unit 265. The second destination position may be a reprojected position or a position that is computed to create a warped image. In step 409 Raster Operation Unit 265 stores the output data, e.g., processed fragment data and/or processed stencil value, in a location in the output buffer corresponding to the second destination position.

Figure 4B:
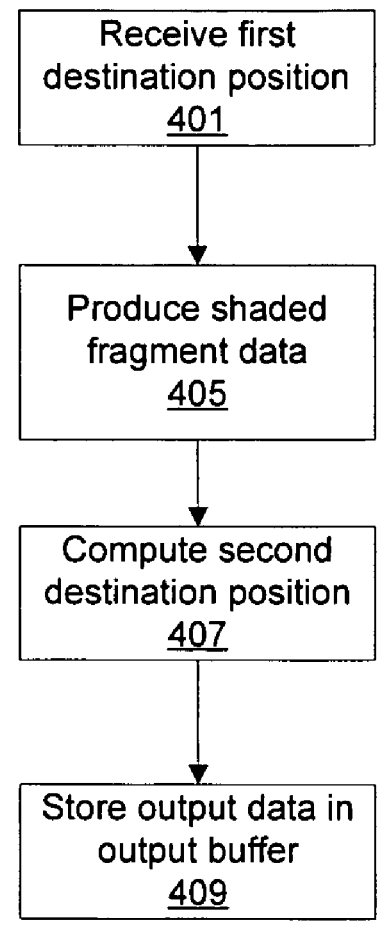

FIG. 4B illustrates an embodiment of a method of determining a destination position for a fragment including the steps shown in FIG. 4A in accordance with one or more aspects of the present invention. The method may be used to compute destination positions to produce a histogram for an image. In step 401 Fragment Shader 255 receives a first destination position corresponding to a fragment. In step 405 Texture unit 310 and Fragment Processing Unit 320 computes shaded fragment data, e.g., color, alpha, depth, and the like. In step 407 Fragment Processing Unit 320 is configured using at least one fragment program instruction to compute a second destination position corresponding to the fragment and to output the second destination position to Raster Operation Unit 265.

The second destination position may be computed based on a portion of the shaded fragment data. For example, shaded fragment data may be sorted based on depth complexity, alpha values, color values, number of texture maps, texture IDs, or the like. An output buffer storing the histogram data is cleared prior to rendering an image. During rendering, values in locations corresponding to each second destination position are updated, e.g., incremented, accumulated, or the like, based on the shaded fragment data. In step 409 Raster Operation Unit 265 stores the output data in a location in the output buffer corresponding to the second destination position.

Figure 4C:
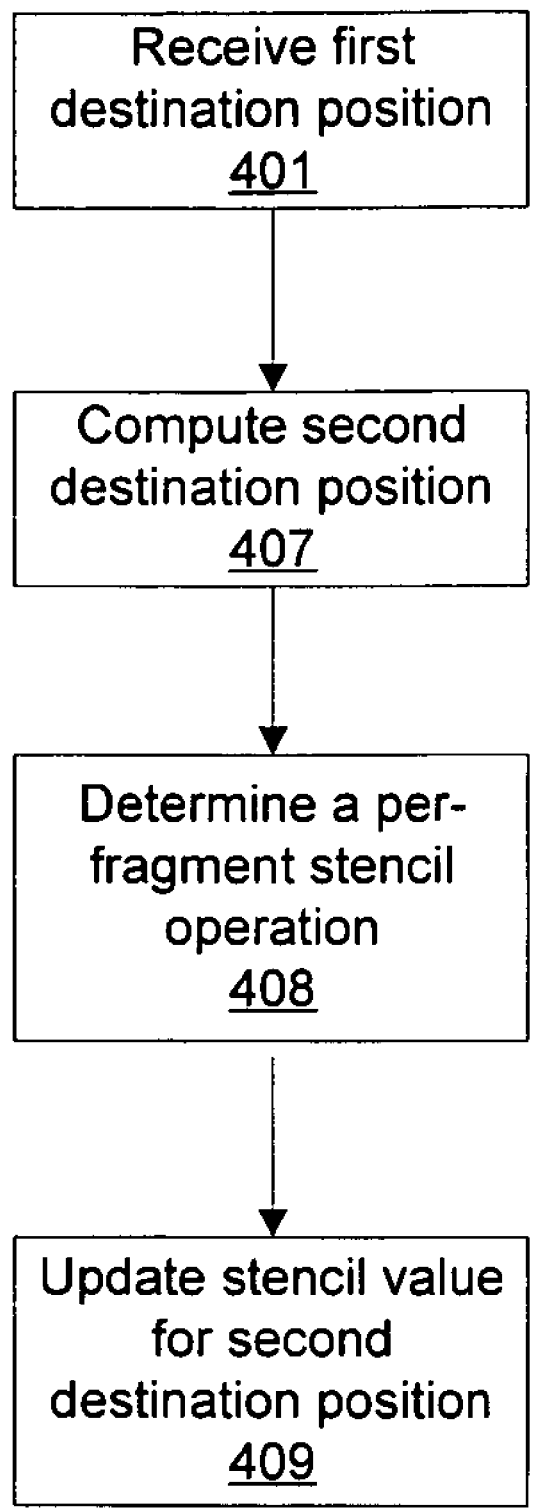
FIG. 4C illustrates an embodiment of a method of using a per-fragment stencil operation to generate a histogram in accordance with one or more aspects of the present invention.

FIG. 4C illustrates an embodiment of a method of using a per-fragment stencil operation to generate a histogram using a stencil buffer including the steps shown in FIG. 4A in accordance with one or more aspects of the present invention. In step 401 Fragment Shader 255 receives a first destination position corresponding to a fragment. In step 407 Fragment Processing Unit 320 is configured using at least one fragment program instruction to compute a second destination position corresponding to the fragment and to output the second destination position to Raster Operation Unit 265. In an alternate embodiment of the present invention, step 407 is omitted and Fragment Processing Unit 320 outputs the first destination position to Raster Operation unit 265.

A stencil buffer storing stencil values representing histogram data is cleared prior to rendering an image. During rendering, stencil values in locations corresponding to each second destination position are updated, e.g., incremented, decremented, cleared, or the like, based on the shaded fragment data. In an alternate embodiment of the present invention, stencil values in locations corresponding to each first destination position are updated based on the shaded fragment data. The present invention provides a stencil buffer extension function that permits the stencil operation to be specified by a fragment program for each fragment rather than for each primitive. In step 408 Fragment Processing Unit 320 is configured using at least one fragment program instruction to compute a per-fragment stencil operation, e.g., INC, DEC, or ZERO, corresponding to the fragment and to output the per-fragment stencil operation to Raster Operation Unit 265. In alternate embodiments of the present invention, in step 408 Fragment Processing Unit 320 is configured using at least one fragment program instruction to compute another per-fragment operation value, e.g., z compare function, alpha function, or blend function.

The per-fragment stencil operation may be computed based on a portion of the shaded fragment data. For example, a per-fragment stencil operation may be computed based on depth complexity for a destination position, an alpha value for the fragment, a color value for the fragment, the number of texture maps for a destination position, texture IDs for texture maps read for the destination position, or the like. In step 409 Raster Operation Unit 265 computes a processed stencil, value using the per-fragment stencil operation and stores the processed stencil value in a location in the stencil buffer corresponding to the second destination position. In an alternate embodiment of the present invention, in step 409 Raster Operation Unit 265 stores the output data, e.g., processed stencil value, in a location in the stencil buffer corresponding to the first destination position.

Figure 5A:
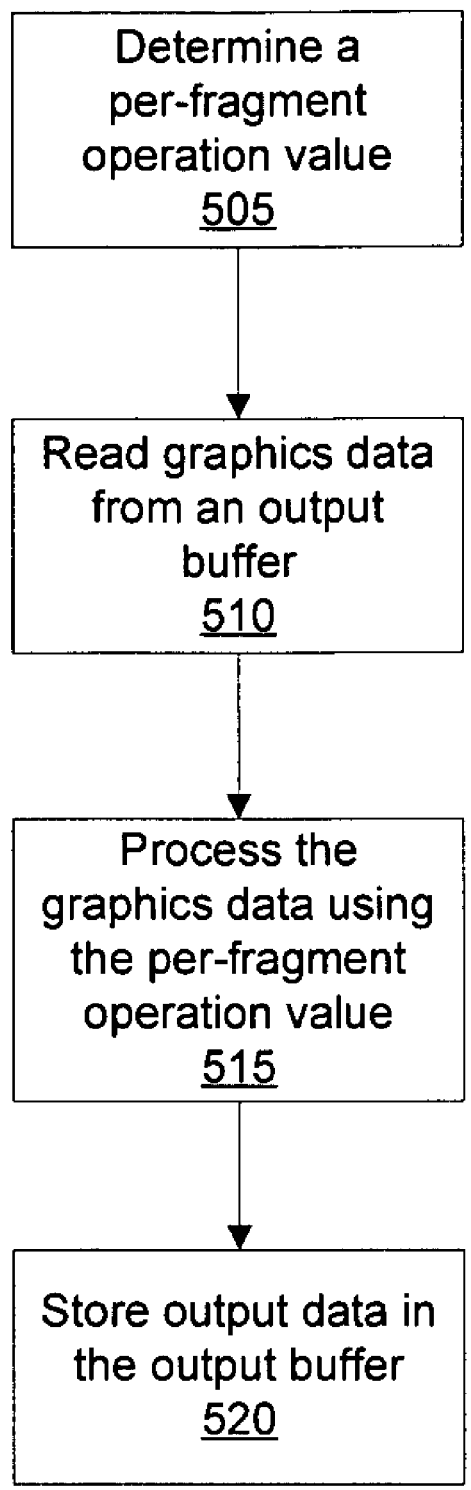
FIG. 5A illustrates an embodiment of a method of using a per-fragment operation extension in accordance with one or more aspects of the present invention.

FIG. 5A illustrates an embodiment of a method of using a per-fragment operation extension in accordance with one or more aspects of the present invention. In step 505 Fragment Shader 255 determines a per-fragment operation value, e.g., stencil operation, z compare function, alpha function, or blend function, as specified by a fragment program and outputs the per-fragment operation value and a destination position to Raster Operation Unit 265. The per-fragment operation value may be computed based on depth complexity for a destination position, an alpha value for the fragment, a color value for the fragment, the number of texture maps for a destination position, texture IDs for texture maps read for the destination position, or the like.

In step 510 Raster Operation Unit 265 reads graphics data from a location in an output buffer corresponding to the destination position. The graphics data read from the output buffer may be a stencil value, z value, color, alpha, or the like. In step 515 Raster Operation Unit 265 processes the graphics data read in step 510 using the per-fragment operation value determined in step 505 to produce output data. For example, Z Test Unit 365 may process stencil values using a per-fragment stencil operation. Z Test Unit 365 may also perform z buffering to process a z value read from an output buffer and a computed z value using a per-fragment z compare function. Blend Unit 370 may perform blending operations to process shaded fragment data and the graphics data using a per-fragment blend function to produce output data. In step 520 Raster Operation Unit 265 stores the output data in the output buffer. The output data is stored at a location in the output buffer specified by the destination position output to Raster Operation Unit 265 by Fragment Shader 255.

Conventionally, a stencil buffer is used to compute the shadow regions for an image based on shadow volumes. Specifically, a scene is rendered in a first pass updating the stencil buffer (incrementing a stencil value) for each front facing shadow volume that lies in front of a non-shadow volume fragment. The scene is rendered in a second pass updating the stencil buffer (decrementing a stencil value) for each back facing shadow volume that lies in front of a non-shadow volume fragment. When a per-fragment operation value is computed for each fragment in accordance with one or more aspects of the present invention, the stencil buffer may be produced for front facing and back facing shadow volumes in a single pass.

Figure 5B:
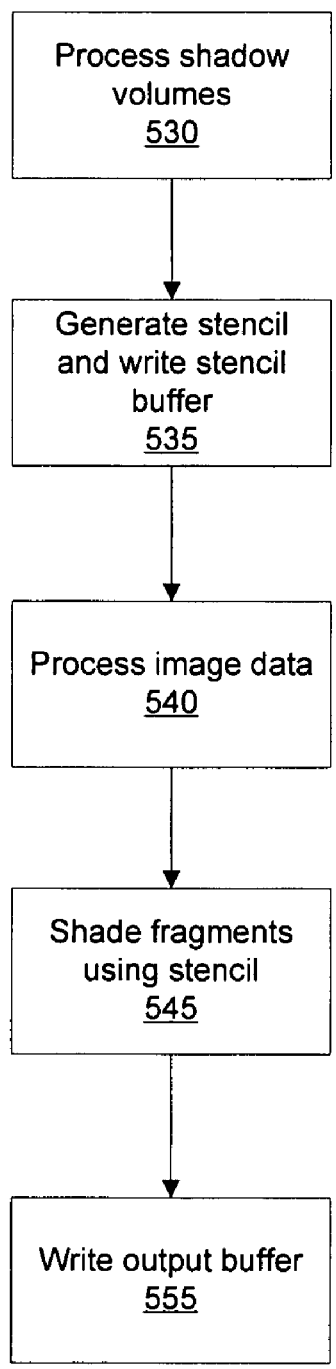
FIG. 5B illustrates an embodiment of a method of using a per-fragment operation extension for use with a stencil buffer in accordance with one or more aspects of the present invention.

FIG. 5B illustrates an embodiment of a method of using a per-fragment operation extension for use with a stencil buffer in accordance with one or more aspects of the present invention. Image data is rendered to produce a z buffer containing the front most z values and in step 530 Graphics Processing Pipeline 203 processes shadow volumes viewed in image space to compute z values for each fragment. The z value for each fragment is compared with the z value for the same position in the z buffer. In step 535 a per-fragment operation value, e.g., stencil operation, is produced based on the result of the z comparison and whether the shadow volume fragment is front or back facing.

For example, when a front facing shadow volume fragment is in front of a z value in the z buffer, a per-fragment stencil operation of INC is generated. When a back facing shadow volume fragment is in front of a z value in the z buffer, a per-fragment stencil operation of DEC is generated. In step 535, Raster Operation Unit 265 receives the per-fragment stencil operation and a destination position from Fragment Shader 255 and updates a stencil value read from a location in the stencil buffer specified by the destination position. The destination position may be a rasterized destination position or a destination position computed within Fragment Shader 255. After the shadow volume fragments have been processed and the stencil values are updated, the stencil buffer contains values produced from shadow volumes. The stencil buffer is used during shading to modify the color of a fragment depending on whether or not the fragment is in or out of shadow.

In step 540 Graphics Processing Pipeline 203 processes the image data to generate fragments and produce shaded fragment data. Z Test Unit 365 compares the z value for each fragment with the z value in the z buffer corresponding to the destination position. When the z test result indicates the values are equal, the fragment data is shaded using a stencil value stored in the stencil buffer corresponding to the destination position. The stencil value indicates whether or not the fragment is in shadow and the fragment data is shaded by Fragment Shader 255 as specified by the fragment program. In step 555 the shaded fragment data is stored in the output buffer by Raster Operation Unit 265.

Conventionally soft shadow mapping is performed by dividing an area light source into several point light sources, e.g., N point light sources. A scene is rendered N times, each time from the point of view of one of the N point light sources to produce N shadow maps, each shadow map corresponding to one of the point light sources. Each shadow map includes shadow data, e.g., depth, stencil, alpha, and the like, for use during shading of the scene. Conventionally, the image data for the scene are processed for each of the N point light sources to generate a shadow map corresponding to each of the N point light sources.

Figure 5C:
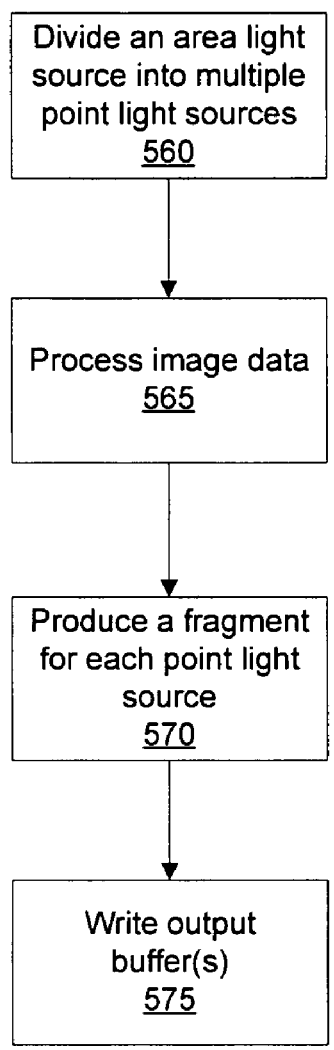
FIG. 5C illustrates an embodiment of a method of using a per-fragment operation extension for producing a shadow map in accordance with one or more aspects of the present invention.

FIG. 5C illustrates an embodiment of a method of using a per-fragment operation extension for producing shadow maps in accordance with one or more aspects of the present invention. Shadow map data for N point light sources are produced in a single pass through Graphics Processing Pipeline 203. In step 560 an area light source is divided into several point light sources, each point light source corresponding to a reprojection, e.g., transformation matrix, based on the position of the point light source. In step 565 Geometry Processor 230 and Rasterizer 250 process the image data to generate fragments. In step 570 each fragment is received and processed by Fragment Shader 255 to produce multiple outgoing fragments, thereby scattering each fragment. Each outgoing fragment corresponds to one of the point light sources generated in step 560.

Therefore, each outgoing fragment has a destination position, computed by Fragment Shader 255, that is independent from destination positions of other outgoing fragments. Furthermore, each outgoing fragment is processed independently, according to a shader program to produce shadow map data. In alternate embodiments of the present invention, the number of outgoing fragment produces from a fragment is determined based on a predetermined parameter or a parameter determined by a fragment program. Unlike, conventional soft shadow mapping, the shadow map data for N point light sources representing one area light source are produced by processing the image data in a single pass through Graphics Processing Pipeline 203

In step 575, Raster Operation Unit 265 receives the shadow map data and a destination position for each outgoing fragment from Fragment Shader 255 and writes the shadow data to a location in an output buffer specified by the destination position. In some embodiments of the present invention, shadow map data corresponding to each point light source is stored in a separate output buffer, so there are N output buffers. In other embodiments of the present invention, all or some of the shadow map data is stored in a single output buffer.

A fragment shader program may generate a histogram, stencil buffer, one or more shadow maps, or perform reprojection or image-based warping by using per-fragment control of a destination position and/or one or more per-fragment operation values. The per-fragment operation values are used to process fragment data within a fragment processing pipeline to produce processed fragment data, such as stencil values, color, depth, or the like. The per-fragment destination positions correspond to locations within an output buffer used to store the processed fragment data and may be computed without tessellating a primitive so that each pixel within the primitive corresponds to a vertex position. Reducing the need to tessellate reduces the processing or time needed to generate an image, shadow map, stencil buffer, or histogram.

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A method for determining a destination position corresponding to a fragment on a per-fragment basis, comprising:

rasterizing a primitive to produce a first destination position;

receiving the first destination position corresponding to the fragment that is independent of vertex positions of a primitive including the fragment;

shading the fragment;

computing a second destination position corresponding to the fragment; and storing output data for the fragment in an output buffer at a location corresponding to the second destination position.

2. The method of claim 1, wherein the second destination position is computed as specified by a fragment program instructions.

3. The method of claim 1, further comprising producing the output data using the first destination position to shade the fragment.

4. The method of claim 1, further comprising determining a per-fragment stencil operation for processing the fragment.

5. The method of claim 4, further comprising computing a stencil value based on the per-fragment stencil operation and writing the stencil value to location in a stencil buffer.

6. The method of claim 5, wherein the location in the stencil buffer corresponds to either the first destination position or the second destination position.

7. The method of claim 1, wherein the second destination position is computed based on fragment data selected from the group including color, transparency, and depth.

8. The method of claim 1, wherein the output data stored in the output buffer represents a histogram for an image including the fragment.

9. The method of claim 8, wherein the histogram includes depth, texture, color, or alpha information for the image.

10. The method of claim 8, wherein the histogram includes processing cycle information or memory access information.

11. The method of claim 1, wherein the second destination position is computed by reprojecting the first destination position.

12. A method for providing per-fragment operation extension using a fragment program, comprising:

rasterizing a primitive to produce a first destination position;

determining a per-fragment operation value using the fragment program, wherein the fragment program includes a step of receiving the first destination position corresponding to a fragment that is independent of vertex positions of a primitive including the fragment;

reading fragment data from a location in an output buffer;

performing a per-fragment operation specified by the per-fragment operation value on the fragment data to produce output data; and storing the output data stored in the location in the output buffer.

13. The method of claim 12, wherein the per-fragment operation is a stencil operation.

14. The method of claim 13, wherein the stencil operation is selected from the group including INC, DEC, and ZERO.

15. The method of claim 12, wherein the output data is a stencil value.

16. The method of claim 12, wherein the per-fragment operation value is determined based on a fragment parameter included in the fragment data.

17. The method of claim 16, wherein the fragment parameter is selected from the group including color, depth, and transparency.

18. The method of claim 12, wherein the location in the output buffer corresponds to a position computed as specified by the fragment program.

19. The method of claim 12, wherein the fragment program processes shadow volumes to generate the output data stored in the output buffer.

20. The method of claim 12, wherein the fragment program generates a histogram for an image including the fragment.

21. The method of claim 20, wherein the histogram includes depth, texture, color, or alpha information for the image.

22. The method of claim 20, wherein the histogram includes processing cycle information or memory access information.

23. A fragment processing pipeline configured to produce shaded fragment data for an output buffer, comprising:

a fragment shader configured to process a fragment to produce the shaded fragment data and compute a destination position for the fragment that is independent of a vertex position of a primitive including the fragment; and a raster operation unit configured to write the shaded fragment data to a location in the output buffer specified by the destination position.

24. The fragment processing pipeline of claim 23, wherein the fragment shader is configured to compute the destination position based on fragment program instructions.

25. The fragment processing pipeline of claim 24, wherein the fragment shader is configured to compute a per-fragment stencil operation.

26. The fragment processing pipeline of claim 25, wherein the raster operation unit is configured to use the per-fragment stencil operation to modify a stencil value stored in the output buffer.

27. The fragment processing pipeline of claim 23, wherein the fragment processing pipeline resides within a graphics processor including a rasterizer configured to compute a destination position for the fragment that is dependent on the vertex position of the primitive including the fragment.

28. The fragment processing pipeline of claim 23, wherein the fragment processing pipeline resides within a computing system including a host processor.

* * * * *